United States Patent
Fourcroy et al.

[19]

[11] Patent Number: 6,062,774

[45] Date of Patent: May 16, 2000

[54] METHOD FOR AUTOMATICALLY DETECTING STABILITY LIMIT OPERATION OF A BULK PRODUCT PNEUMATIC CONVEYOR INSTALLATION OPERATING IN DENSE PHASE

[75] Inventors: Jean-Pierre Fourcroy, Leers; Thierry Guerra, Bouchain; Patrick Pacaux, Valenciennes; Thierry Destoop, Bondues, all of France

[73] Assignee: Neu Transf'Air, Marcz en Baroeul, France

[21] Appl. No.: 09/000,072

[22] PCT Filed: May 27, 1997

[86] PCT No.: PCT/FR97/00924

§ 371 Date: Jan. 22, 1998

§ 102(e) Date: Jan. 22, 1998

[87] PCT Pub. No.: WO97/45351

PCT Pub. Date: Dec. 4, 1997

[30] Foreign Application Priority Data

May 28, 1996 [FR] France .................................. 96 06774

[51] Int. Cl.[7] .................................................. B65G 53/00
[52] U.S. Cl. ............................................................. 406/197
[58] Field of Search ............................... 406/197, 10, 14, 406/28, 34

[56] References Cited

FOREIGN PATENT DOCUMENTS

| 0297463 | 1/1989 | European Pat. Off. . |
|---|---|---|
| 0490174 | 6/1992 | European Pat. Off. . |

*Primary Examiner*—Kenneth W. Noland
*Attorney, Agent, or Firm*—Ladas & Parry

[57] ABSTRACT

The invention makes it possible automatically to detect operation at the limit of stability in an installation for pneumatically conveying a substance in bulk and in dense phase, in which the carrier gas and the bulk substance are injected separately into a lock (3) whose outlet communicates with a duct (4) for pneumatically conveying the bulk substance. The method consists in measuring the "lock" pressure (Pe) which is exerted by the carrier gas in the vicinity of the zone (3a) where the bulk substance is injected into the conveyor duct (4), and in detecting instability in the measured lock pressure (Pe) over a predetermined duration (t), by means of a defined stability criterion. More particularly, the stability criterion consists in performing at least one fuzzy split of the measured pressure values (Pe) in application of a predefined membership function, sampling period, and time interval, and in calculating a stability index on the basis of said fuzzy split.

8 Claims, 3 Drawing Sheets

METHOD FOR AUTOMATICALLY DETECTING STABILITY LIMIT OPERATION OF A BULK PRODUCT PNEUMATIC CONVEYOR INSTALLATION OPERATING IN DENSE PHASE

The present invention is applicable in the field of monitoring the stability of operation in an installation designed for pneumatically conveying a substance in bulk, in dense phase. The invention relates to a method making it possible to detect automatically when such an installation is operating at the limit of stability, and also more generally to application thereof to automatically determining a limiting operating point between a zone of stability and a zone of instability.

In the field of processing substances in bulk on an industrial scale, it is known that the bulk substance to be processed can be conveyed in a leakproof conveyor duct by means of a flow of gas, e.g. for taking the substance directly from the outlet of an extruder and conveying it to storage silos for the purpose of subsequently processing the extruded substance, or indeed taking the substance from the outlet of a first storage silo to another industrial processing zone. To this end, a pneumatic conveyor installation is used which includes a member commonly referred to as a "lock" which has the function of injecting the carrying gas flow and the bulk substance simultaneously into the leakproof conveyor duct. In general, the lock is in the form of a chamber into which the bulk substance and the flow of carrier gas, generally air, are injected separately. Additionally, a certain type of lock advantageously includes a system for regulating the rate at which the bulk substance is injected into the chamber of the lock. More particularly, the regulation system consists, for example, in a rotary bladed wheel that rotates at a speed which is adjustable as a function of the desired flow rate of the bulk substance.

In the field of pneumatically conveying substances in bulk, there are at present two main families:

conveying can be in dense phase which is performed at a travel speed that is low, in practice less than 12 meters per second (m/s), and maybe as little as 0.5 m/s, with the concentration of the substance in the conveyor duct being high; and conveying can be in dilute phase which, on the contrary, is performed at a much higher travel speed, while the concentration of the bulk substance is much lower.

In practice, conveying in dense phase is characterized by pulsating operation, with the bulk substance moving inside the conveyor duct in the form of compact plugs of matter, separated from one another by pockets of gas.

The present trend is to develop pneumatic conveying in dense phase since that has the advantage not only of making it possible to work with lower rates of gas flow, but also of keeping down the wear of the conveyor ducts over time while conserving better quality in the conveyed substance, compared with conveying in dilute phase.

An installation for pneumatic conveying in dense phase is conventionally designed to operate at a predetermined load factor corresponding to the ratio of the flow rate of the bulk substance and the flow rate of the conveying gas at the inlet to the lock. To enable the conveyor installation to operate in stable manner while in dense phase, it is necessary for the load factor to remain within a narrow range of values. Varying the flow rate of the air or the flow rate of the bulk substance injected into the lock can lead very easily to causing the installation to operate in unstable manner, and in particular in a critical phase in which the installation oscillates between operating in dense phase and operating in dilute phase, and vice versa. It is absolutely essential to avoid this critical phase since it gives rise mechanically to hammering in the conveyor duct which leads to the installation being damaged very quickly.

In order to maintain the load factor of a given installation at a predetermined value, proposals have been made, for example in European patent application EP 490 174 in the name of the Bühler company, to keep the flow rate of the carrier gas and/or the flow rate of the bulk substance at the inlet of the lock constant on the basis of a measurement of pressure in the zone where the bulk substance is injected into the conveyor duct, so as to compensate for leakage of the carrier gas from the lock.

Nevertheless, maintaining a constant load factor by regulating the gas flow rate and/or the flow rate of material in an installation is not sufficient for ensuring that the installation conserves operation in dense phase that is stable over time, and more particularly to ensure that the installation does not switch accidentally into the above-mentioned critical operating phase. This can be explained by the fact that the island of stability in which it is necessary to maintain the load factor itself varies over time and depends on various physical parameters, such as the quality of the substance being conveyed, temperature, humidity, etc., for example. These parameters mean that it is possible, given the small size of the island of stability, for an installation which operates in stable manner in dense phase on one day to operate in an unstable critical phase on another day even through the load factor has not changed.

For the above reasons, it is found to be necessary to monitor the operation of a dense phase conveyor installation constantly in order to ensure that it continues to operate in stable manner. At present, such monitoring is performed by a human operator who tries to detect operation at the limit of stability, in particular on the basis of the flow noise of the carrier gas and of the bulk substance in the conveyor duct, and as a function of personal experience concerning the behavior of the installation, and to correct manually the flow rate of the gas or of the substance, i.e. to correct the load factor of the installation, e.g. by opening a valve or by varying the speed of rotation of the bladed wheel of the lock. When using such detection by means of a human operator, there remains a substantial risk of the installation entering the above-mentioned critical phase of operation.

A first object of the present invention is to provide a method of automatically detecting operation at the limit of stability in an installation for pneumatically conveying a substance in bulk in dense phase, in which the carrier gas and the bulk substance are injected separately into a lock whose outlet communicates with a duct for pneumatically conveying the bulk substance.

In a manner characteristic of the invention, the method consists in measuring the "lock" pressure Pe exerted by the carrier gas in the vicinity of the zone in which the bulk substance is injected into the conveyor duct, and in detecting instability in the measured lock pressure Pe over a predetermined duration t by means of a defined stability criterion.

It has been observed that the pressure Pe in the vicinity of the lock tends to fluctuate to a greater or lesser extent as the installation comes close to a zone of instability, and in particular that it passes via a detectable intermediate phase prior to the installation reaching complete instability. The merit of the invention is to have shown up this particular behavior of the lock pressure at the limit of stability, to have shown that the intermediate phase through which the lock pressure passes can be detected automatically, and to have verified that on the basis of such detection it is possible automatically and reliably to detect operation that is at the limit of stability, even though the installation is still operating in stable manner.

Because of the invention, it thus becomes possible to make any necessary measurements in time to be able to correct the flow rate of the bulk substance and/or of the carrier gas at the inlet to the lock before the installation reaches unstable operation, with it being possible for such correction to be performed either automatically on the basis of a detection signal or else manually by an operator warned by any appropriate alarm means of the installation operating at the limit of stability.

The duration t must be selected to be large enough to avoid detecting a fluctuation in lock pressure that is no more than an isolated event in time, and which, as a result, is not representative of genuine instability over time in the pressure of the lock. In practice, the duration t will have the same order of magnitude as the mean transit time of a plug of bulk substance travelling through the installation, and needs to be determined on a case-by-case basis as a function, in particular, of the length of the conveyor duct of the installation and of the nature of the substance conveyed.

The lock pressure Pe can be measured in the conveyor duct downstream from the lock outlet. Nevertheless, it is appropriate for this measurement to be performed at a suitably small distance from the lock outlet, and preferably at a distance that is shorter than a few meters, so that the measured pressure is characteristic of the pressure in the zone where the bulk substance is injected into the conveyor duct. Measuring lock pressure downstream from the lock outlet suffers from the drawback of giving rise over time to a risk of the measurement sensor used becoming clogged with the bulk substance. That is why it is preferable to measure lock pressure Pe upstream from the lock, in the feed duct for carrier gas, upstream from a non-return valve mounted in said duct.

In the context of the invention, for the purpose of detecting the intermediate phase through which the lock pressure Pe passes, it is possible to envisage any stability criterion known to a specialist in signal processing. For example, the application of a stability criterion can consist in splitting the measured pressure values in binary manner as a function of a predetermined threshold, and in detecting the presence of instability once the number of measured values greater than the threshold reaches a given percentage over the period t, for example reaches 80%. Nevertheless, splitting the measured lock pressures in binary manner suffers from the drawback of losing information: this makes the stability criterion less fine so it is possible using a binary split, that a limit of stability will be detected prematurely, or on the contrary, in some cases, that it will be detected too late.

For the purpose of using a stability criterion that is both relatively simple to implement and sufficiently fine to be capable of detecting reliably the intermediate phase through which lock pressure passes, the stability criterion used preferably consists in performing at least one fuzzy split of the measured pressure values Pe in application of a predefined membership function, sampling period A, and time interval T, and in calculating a stability index I on the basis of the fuzzy split.

In another variant, instability in the signal measuring lock pressure Pe can be detected in conventional manner by processing the signal using a fast Fourier transform (FFT). Nevertheless, this method suffers from the drawback of being relatively complex to implement.

More particularly, in a first variant, a fuzzy split is implemented using as a variable $[\epsilon_1(n\Delta)=Pe_{mean}-Pe(n\Delta)]$, i.e. the difference between the measured lock pressure and the mean lock pressure over the interval T.

In a second variant, a fuzzy split is implemented using as a variable $[\epsilon_2(n\Delta)=Pe_{cons}-Pe(n\Delta)]$, i.e. the difference between the measured lock pressure and a predetermined pressure value $Pe_{cons}$ which the lock pressure Pe ought theoretically to have over the interval T. This second variant is particularly well adapted to the case where the installation is regulated automatically on the basis of measuring lock pressure. Under such circumstances, the predetermined pressure $Pe_{cons}$ is the value of lock pressure that is used as the reference for regulating the installation.

Advantageously, for a given fuzzy split, the stability index I is given by the formula:

$$I = \frac{Z}{T/\Delta}$$

where Z represents the degree of membership in the zero class of the membership function.

Preferably, both above-specified variants are combined. In which case two stability indices $I_{stab}$ and $I_{prec}$ are calculated, one for each of the fuzzy splits, and instability of the measured lock pressure Pe is detected when at least one of the two stability indices $I_{stab}$ and $I_{prec}$ is less than a predetermined threshold S.

The island of stability for the load factor of a pneumatic conveyor installation operating in dense mode depends not only on the installation itself, and more particularly on the length and the shape of the duct for conveying the bulk substance, but also on the type of bulk substance conveyed. Thus, for a given installation, when the type of bulk substance to be conveyed is changed, it is necessary to adjust the load factor to make the installation operate in stable manner.

Another object of the present invention is a method of automatically determining a limiting operating point between a zone of stability and a zone of instability in an installation for pneumatically conveying a bulk substance in dense phase.

According to the invention, the method of determining a limit operating point consists in starting from a known initial stable point, in automatically causing the flow rate of the bulk substance and/or the flow rate of the carrier gas at the inlet to the lock to vary by successive predetermined steps, and at each step in applying the detection method of the invention as described above.

Other characteristics and advantages of the invention appear more clearly on reading the description made below of a particular implementation of the method of detecting operation at the limit of stability in an installation for pneumatically conveying a substance in bulk in dense phase, which description is given by way of non-limiting example and with reference to the accompanying drawings, in which.

Figure 1:
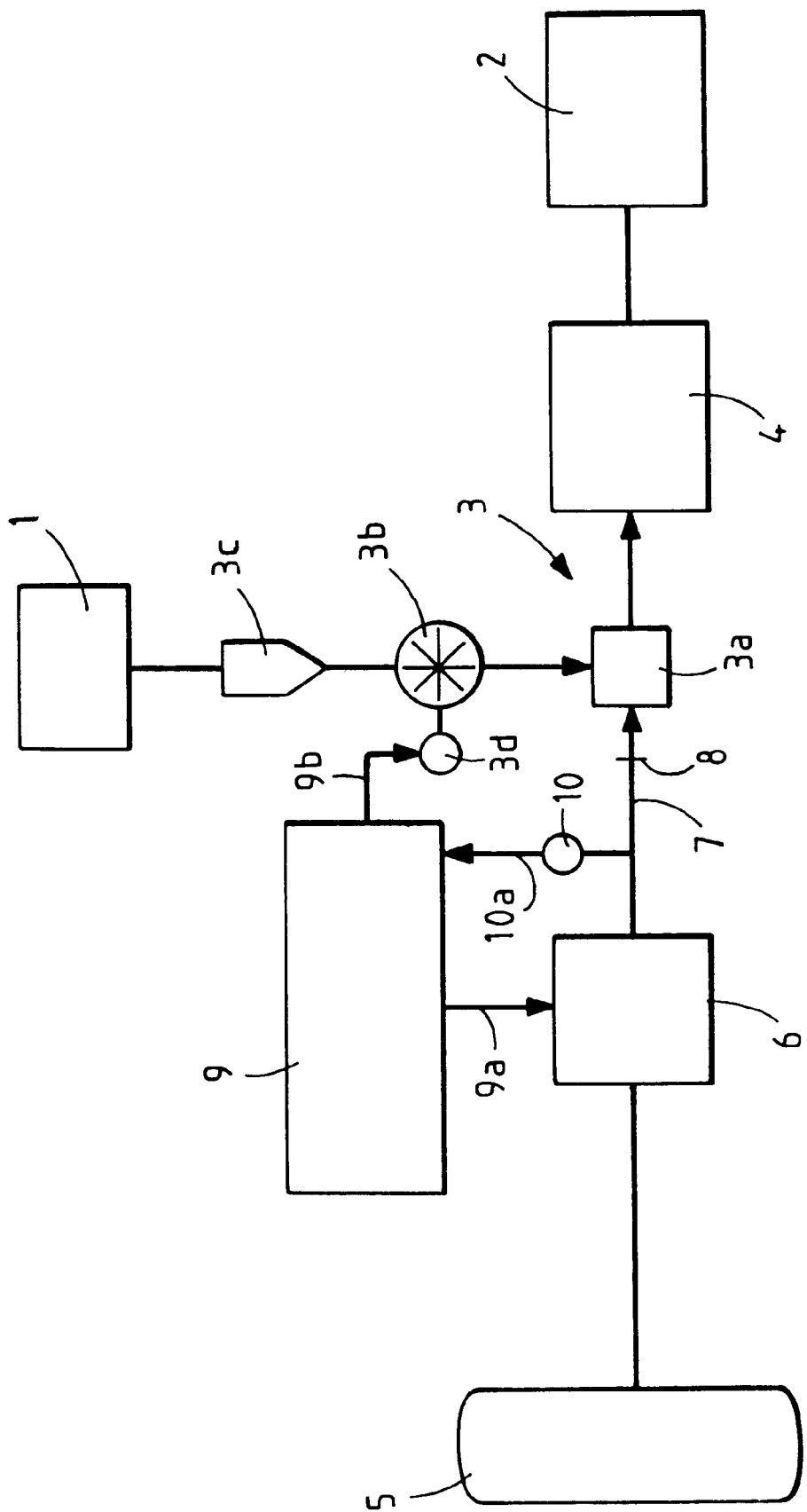
FIG. 1 is a block diagram of an installation for pneumatically conveying a bulk substance in dense phase under the control of a processor unit which is programmed to implement the method of the invention of automatically detecting a point of operation at the limit of stability for the installation.

The pneumatic conveyor installation shown diagrammatically in FIG. 1 is used for conveying a bulk substance in dense phase from one point to another, and in the example shown from the outlet of an extruder 1 to a silo 2. In conventional manner, this pneumatic conveyor installation includes a member 3 that performs a lock function, and into which there are injected separately both the bulk substance to be conveyed and a carrier gas, which is constituted by air in this case. More particularly, in the example shown, the lock 3 has a zone 3a in which the bulk substance and the carrier air are brought into contact, and which has an outlet communicating with a leakproof conveyor duct 4. The bulk substance is thus conveyed by the carrier air inside the duct 4 all the way to the silo 2. The shape and the length of the conveyor duct 4 vary from one installation to another.

The bulk substance is fed into the zone 3a via a rotary bladed wheel 3b whose speed of rotation can be adjusted to adjust the rate at which the bulk substance to be conveyed is injected into the inlet of the zone 3a. The bulk substance from the extruder 1 is fed continuously to the bladed wheel 3b via a hopper 3c, thus making it possible to accommodate a certain amount of fluctuation in the flow rate of the bulk substance at the outlet from the extruder. The carrier air is fed at a given pressure into the zone 3a by means of a feed duct 7 fitted with a non-return valve 8. The carrier air generator system upstream from the lock 3 comprises one or more compressors 5 of outlet associated with a flow rate regulating valve 6 which is designed to ensure a given flow rate of carrier air in the feed duct 7.

The pneumatic conveyor installation is controlled by a processor unit 9 which controls both the carrier air flow rate $Q_{tp}$ in the feed duct 7 by means of a control signal 9a applied to the flow rate regulator valve 6, and the speed of rotation of the bladed wheel 3b, and thus the flow rate $Q_s$ of the substance in bulk, by means of a control signal 9b applied to the motor 3d for rotating the bladed wheel. The installation is also fitted with a sensor 10 for measuring the pressure Pe in the lock as exerted by the carrier air in the feed duct 7. The sensor 10 is located upstream from the non-return valve 8, thereby protecting it from any risk of clogging, and it delivers a measurement signal 10a to the processor unit 9. The processor 9 is also designed in conventional manner to control the flow rate regulating valve 6 as a function of a predetermined reference pressure $Pe_{cons}$, and on the basis of the measurement signal 10a delivered by the sensor 10.

Figure 2:
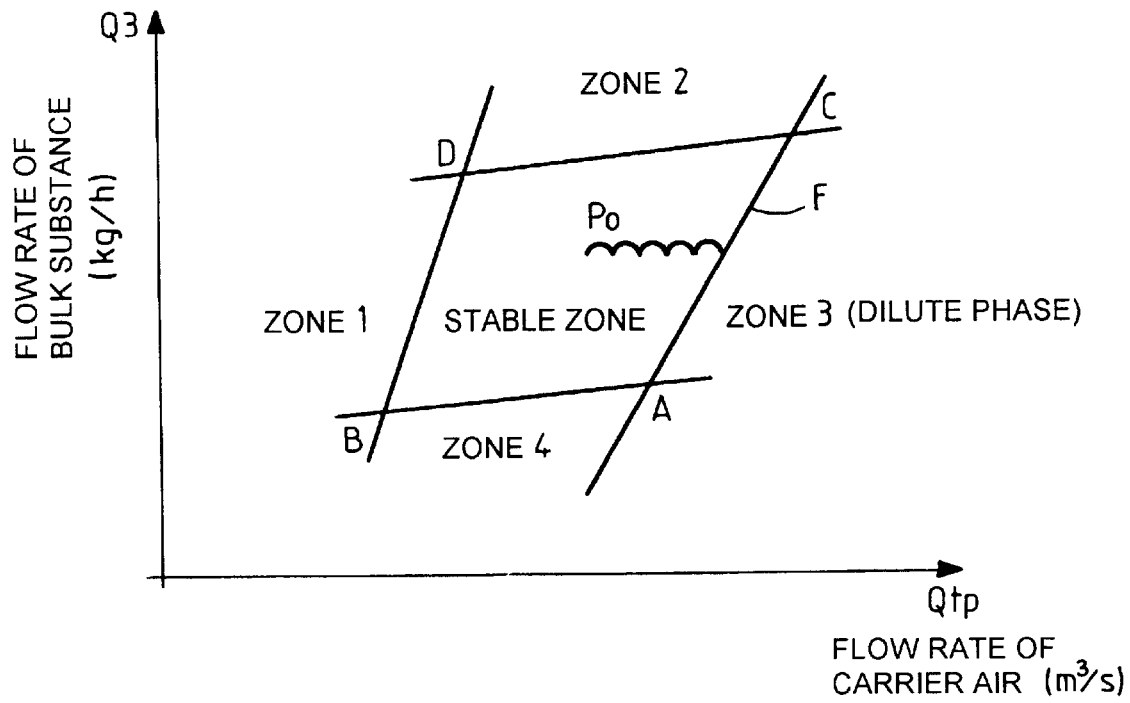
FIG. 2 is a graph showing the island of stability of the pneumatic conveyor installation of FIG. 1.

FIG. 2 is a stability diagram, in dense phase for the pneumatic conveyor installation of FIG. 1, with the flow rate of the carrier air $Q_{tp}$ in the vicinity of the zone 3a being plotted along the abscissa and with the flow rate $Q_s$ of the bulk substance injected into the inlet of the zone 3a of the lock 3 being plotted up the ordinate. The zone of stability in dense phase for the installation is defined by a quadrilateral having vertices constituting four operating points A, B, C, and D all at the limit of stability. For the pneumatic conveyor installation to operate in stable manner in dense phase, it is necessary for the bulk substance flow rate $Q_s$ and for the carrier air flow rate $Q_{tp}$ to be adjusted so as to define an operating point situated inside the quadrilateral ABCD. Outside this quadrilateral, the pneumatic conveyor installation operates in unstable manner and its behavior depends on the particular zone of instability in which the operating point $(Q_{tp}, Q_s)$ is to be found. With reference to FIG. 2, the zone of instability corresponds, for example, to a bulk substance being conveyed in dilute phase. When the installation is operating in the zone of stability defined by the quadrilateral ABCD, the bulk substance is conveyed inside the conveyor duct 4 in the form of successive plugs of matter which are separated by pockets of carrier air. In dilute phase (zone 3), either because of the high speed of the carrier air or because of the low concentration of the bulk substance inside the duct, these plugs break up. Passing from operation in dense phase (stable zone) to operating in dilute phase (zone 3), and vice versa, gives rise to hammering in the conveyor duct and that can damage the installation very quickly. In addition, the quality of the conveyed bulk substance is spoilt. That is why it is essential to prevent a pneumatic conveyor installation that is designed to operate in dense phase from passing into instability zone 3.

The quadrilateral of stability for a pneumatic conveyor installation depends on the conveyor installation itself, i.e. in particular on the shape and the length of the conveyor duct 4; however, it also depends on the bulk substance being conveyed. In addition, for a given bulk substance and a given installation, it has been observed that the limits of this quadrilateral of stability can vary over time, in particular as a function of the quality of the bulk substance to be conveyed, of its temperature, and of ambient temperature or humidity. As a result, firstly an operating point in a stable zone for a given installation and a given bulk substance does not necessarily correspond to a stable operating point for the same installation after the bulk substance has been changed, and secondly, for a given installation and for a given bulk substance, an operating point that is stable but close to one of the boundaries of the quadrilateral of stability ABCD can turn out on some particular day to lie in a zone of instability.

In order to ensure that the pneumatic conveyor installation is adjusted to an operating point that always lies in a zone of stability, the processor unit 9 is suitable, according to the invention, for implementing a test procedure which makes it possible to detect whether or not the operating point of the installation is at the limit of stability, by detecting instability in the measured lock pressure over a predetermined time interval.

Figure 3:
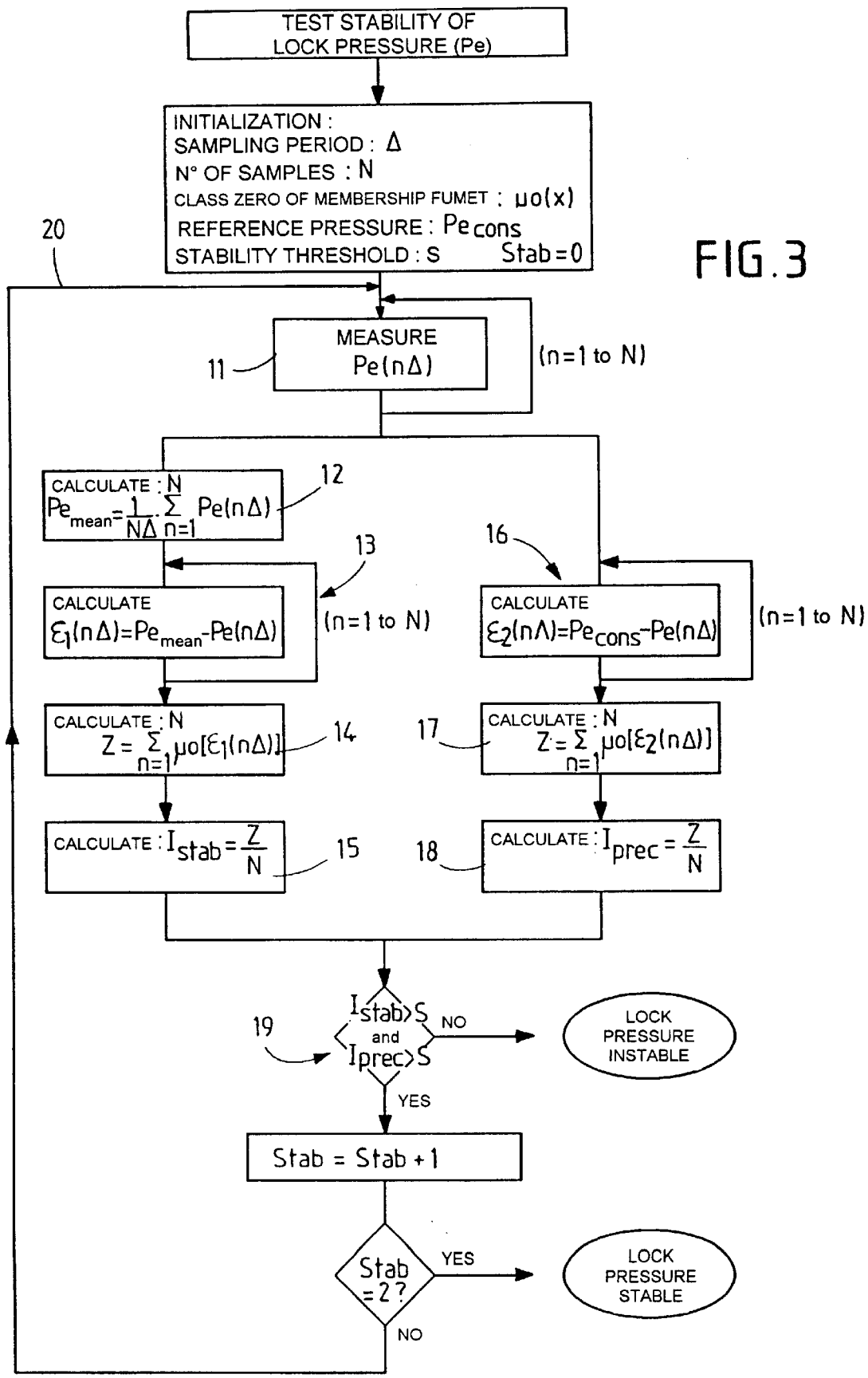
FIG. 3 is a flow chart for implementing a preferred implementation of the method of the invention for automatically detecting lock pressure instability.

One particular variant of the test procedure implemented by the processor unit 9 to detect whether or not an operating point is at the limit of the stable zone is described below on the basis of the flow chart of FIG. 3. The basic principle on which such detection relies is detecting instability of lock pressure Pe by means of two stability indices $I_{stab}$ and $I_{prec}$. More particularly, these two indices are calculated automatically on the basis of a fuzzy split of the measured lock pressure values Pe. With reference to FIG. 3, the initial and predetermined parameters of this test procedure are as follows:

the sampling period A and the number of measured samples of the value of lock pressure Pe;

the membership function used for the fuzzy split; in this case the zero class of this membership function is used, written $\mu_o(x)$;

the reference pressure $Pe_{cons}$ which corresponds to that used by the processor unit for controlling opening of the regulator valve 6; and the stability threshold S which applies to the above-specified stability indices $I_{stab}$ and $I_{prec}$.

The first test step, referenced 11, consists in taking a sampled measurement of the lock pressure Pe on the basis of the measurement signal 10a delivered by the pressure sensor 10. The processor unit 9 thus acquires N samples Pe(nΔ) of lock pressure. It should be observed that the duration T during which this measurement is performed corresponds to the product of the number of samples N multiplied by the sampling period A. The duration T, i.e. the number of measurement samples N for a given sampling period A is preferably selected to be equal to the mean transit time of the bulk substance through the installation. The value of the duration T therefore depends in particular on the length of the conveyor duct 4 of the installation, and on the nature of the bulk substance conveyed.

Once the lock pressure samples Pe(nΔ) have been acquired, two separate processes are performed in order to calculate separately the stability index $I_{stab}$ (steps 12 to 15 of the flow chart of FIG. 3) and the stability index $I_{prec}$ (steps 16 to 18 of the flow chart of FIG. 3). These steps of calculating the two indices are sufficiently explicit in the flow chart of FIG. 3 and are therefore not repeated in the present description. The index $I_{stab}$ takes account of the effective stability of lock pressure Pe relative to the mean pressure $Pe_{mean}$ calculated over the interval T. The index $I_{prec}$ takes account of the precision of the lock pressure value Pe compared with the regulation reference $Pe_{cons}$ for controlling opening of the valve 6.

Once the stability indices $I_{stab}$ and $I_{prec}$ have been calculated, the processor unit 9 is programmed to compare these two indices with the stability threshold S (step 19). If either one of the indices is less than the threshold S, then the lock pressure is considered as being unstable. Providing both stability indices $I_{stab}$ and $I_{prec}$ are greater than the threshold S, then a second series of measurements is performed restarting the procedure at step 11 (loop 20). If at the end of this second test procedure both stability indices $I_{stab}$ and $I_{prec}$ are still greater than the threshold S, then the pressure of the lock is considered to be stable.

It is preferable to use both indices $I_{stab}$ and $I_{prec}$, since with substances that are known to be difficult it can happen that the behavior of the lock pressure Pe is not linear in the boundary zones of the stability quadrilateral ABCD. For example, an installation may stabilize during a plurality of successive transit times T about a pressure value that is different from the requested reference pressure, in which case $I_{stab}$ will be close to one in value while $I_{prec}$ is close to zero in value, and then stabilize either about the reference pressure value or else drop suddenly and start oscillating, indicating a zone of pressure instability.

At this point it should be specified that the particular method of detecting instability of lock pressure shown in FIG. 3 is not limited to a single iteration (loop 20) but could be implemented with a larger number of iterations or indeed without any iteration, with the stability criterion then resting on a single series of sampled measurements (step 11). The number of iterations corresponding to the loop 20 in the flow chart of FIG. 3 determines the duration t during which the stability criterion is applied in accordance with the invention.

Figure 4:
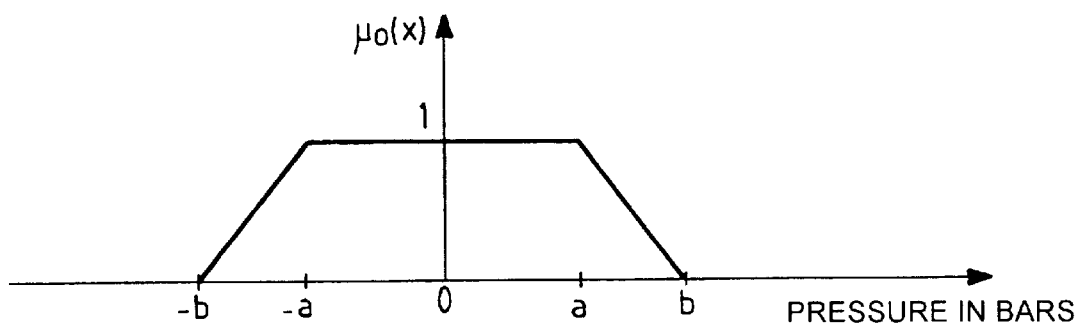
FIG. 4 shows a particular trapezoidal membership function which is used when implementing the steps of the FIG. 3 flow chart.

In a preferred embodiment, the membership function used is trapezoidal in shape, with the zero class ($\mu_o(x)$) of said membership function being shown in FIG. 4.

The method of detecting an operating point at the limit of stability as implemented by the processor unit 9 may advantageously be implemented in automatic monitoring software that also serves to help in running an installation for pneumatically conveying a substance in bulk in dense phase. By way of example, the software displays to an operator the measured lock pressure signal, automatically processes the signal using the detection method of the invention, and continuously displays the state of the installation (stable, not stable) to the operator via a dialog window. The operator must then modify the parameters of the installation manually (flow rate of the bulk substance and/or flow rate of the carrier air) to find an operating point that is stable. In the context of such software for monitoring and providing assistance in running the installation, the processor unit 9 may also generate a visible or audible alarm signal whenever it detects instability in the lock pressure Pe. Also, it is possible to envisage designing the processor unit 9 in such a manner that it automatically adjusts the carrier flow rate and/or the bulk substance flow rate by means of the control signals 9*a* and 9*b* so as to track variation over time in the stability diagram, which for a given installation and a given bulk substance varies as a function of the quality of the bulk substance and as a function of the conditions of air temperature, pressure, or humidity.

In another application, the processor unit 9 may be designed so as to characterize automatically an operating point at the limit of stability, particularly prior to the installation for conveying a given bulk substance being definitively put into operation. To this end, the processor unit is designed to adjust the installation via the control signals 9*a* and 9*b* on an initial operating point $P_0$ that is stable (FIG. 2) and then cause the flow rate $Q_s$ of the bulk substance to vary in successive predetermined steps (control signal 9*b*) and/or the flow rate $Q_{tp}$ of the carrier air (control signal 9*a*) to vary in successive predetermined steps, with the test procedure of FIG. 3 being applied on each successive step, and to continue until a boundary of the stability diagram is detected, for example the boundary F with instability zone 3 (FIG. 2).

In the context of the particular embodiment described with reference to FIGS. 1 to 4, the lock pressure Pe is measured upstream from the lock in the feed duct 7. In more general manner, in the context of the invention, this measurement could be performed in the zone 3*a* of the lock, or in the conveyor duct 4 close to the point where the bulk substance is injected into the conveyor duct 4.

What is claimed is:

1. A method of automatically detecting operation at the limit of stability in an installation for pneumatically conveying a substance in bulk in dense phase, in which a carrier gas and the bulk substance are injected separately into a lock (3) whose outlet communicates with a duct (4) for pneumatically conveying the bulk substance, the method comprising measuring the "lock" pressure Pe exerted by the carrier gas in the vicinity of a zone (3*a*) in which the bulk substance is injected into the conveyor duct (4), and detecting instability in the measured lock pressure Pe over a predetermined duration t by means of a defined stability criterion.

2. A method according to claim 1, wherein the stability criterion consists in performing at least one fuzzy split of the measured pressure values Pe in application of a predefined membership function ($\mu$), sampling period A, and time interval T, and in calculating a stability index I on the basis of the fuzzy split.

3. A method according to claim 2, wherein a fuzzy split is implemented using as a variable [$\epsilon_1(n\Delta)=Pe_{mean}-Pe(n\Delta)$], i.e. the difference between the measured lock pressure and the mean lock pressure over the interval T.

4. A method according to claim 3, wherein a fuzzy split is implemented using a variable [$\epsilon_2(n\Delta)=Pe_{cons}-Pe(n\Delta)$], i.e. the difference between the measured lock pressure and a predetermined pressure value $Pe_{cons}$ which the lock pressure Pe ought theoretically to have over the interval T.

5. A method according to claim 4 wherein for a given fuzzy split, the stability index I is given by the formula:

$$I = \frac{Z}{T/\Delta}$$

wherein z represents the degree of membership in the zero class ($\mu_o[x]$) of the membership function.

6. A method according to claim 5, wherein instability is detected in the measured lock pressure Pe when at least one of two stability indices $I_{stab}$ and $I_{prec}$ which are calculated for each fuzzy split is less than a predetermined threshold S.

7. A method according to claim 6, wherein the membership function is a trapezoidal function.

8. A method of automatically determining a limiting operating point between a zone of stability and a zone of instability in an installation for pneumatically conveying a bulk substance in dense phase, in which the carrier gas and the bulk substance are injected separately into a lock (3) whose outlet communicates with a duct (4) for pneumatically conveying the bulk substance, the method comprising starting from a known initial stable point ($P_o$) in automatically causing the flow rate ($Q_s$) of the bulk substance and/or the flow rate ($Q_{tp}$) of the carrier gas at the inlet to the lock (3) to vary by successive predetermined steps, and at each step in applying the detection method specified in any one of claims 1 to 7.

* * * * *